(12) United States Patent
Renaudin et al.

(10) Patent No.: US 7,533,543 B2
(45) Date of Patent: May 19, 2009

(54) REINFORCING DEVICE FOR BUSHING USED TO PRODUCE FILAMENTS, SUCH AS GLASS-BASED FILAMENTS

(75) Inventors: Jean-Pierre Renaudin, St-Sulpice (FR); Jean-Louis Thiriet, Chambery (FR)

(73) Assignee: Saint-Gobain Technical Fabrics Europe, Chambery (FR)

( * ) Notice: Subject to any disclaimer, the term of this patent is extended or adjusted under 35 U.S.C. 154(b) by 387 days.

(21) Appl. No.: 10/544,742

(22) PCT Filed: Feb. 4, 2004

(86) PCT No.: PCT/FR2004/000255

§ 371 (c)(1),
(2), (4) Date: Apr. 24, 2006

(87) PCT Pub. No.: WO2004/074195

PCT Pub. Date: Sep. 2, 2004

(65) Prior Publication Data

US 2006/0201207 A1     Sep. 14, 2006

(30) Foreign Application Priority Data

Feb. 12, 2003   (FR) .................................. 03 01851

(51) Int. Cl.
*C03B 5/00* (2006.01)

(52) U.S. Cl. ............................. 65/495; 65/499; 65/492; 65/494; 373/28

(58) Field of Classification Search ................... 65/495, 65/499, 492, 493, 494; 373/28
See application file for complete search history.

(56) References Cited

U.S. PATENT DOCUMENTS

| 3,920,430 | A | | 11/1975 | Carey |
| 4,698,082 | A | * | 10/1987 | Jensen ......................... 65/494 |
| 6,158,249 | A | * | 12/2000 | Battigelli et al. .............. 65/522 |
| 2003/0000259 | A1 | | 1/2003 | Bemis |

FOREIGN PATENT DOCUMENTS

| FR | 2 334 637 | 7/1977 |
| JP | 57 191245 | 11/1982 |

* cited by examiner

*Primary Examiner*—Mark Halpern
(74) *Attorney, Agent, or Firm*—Oblon, Spivak, McClelland, Maier & Neustadt, P.C.

(57) ABSTRACT

A reinforcement device, especially for the bottom of a bushing having a multitude of holes from which filaments, e.g., glass filaments, are drawn, including a reinforcement piece that includes a hollow first part defining at least one receiving housing and a second part that extends at least partly over the length of the hollow part, and also at least one stiffener inserted into the receiving housing of the hollow part. The cross section of the stiffener is substantially identical to the internal cross section of the hollow part.

20 Claims, 3 Drawing Sheets

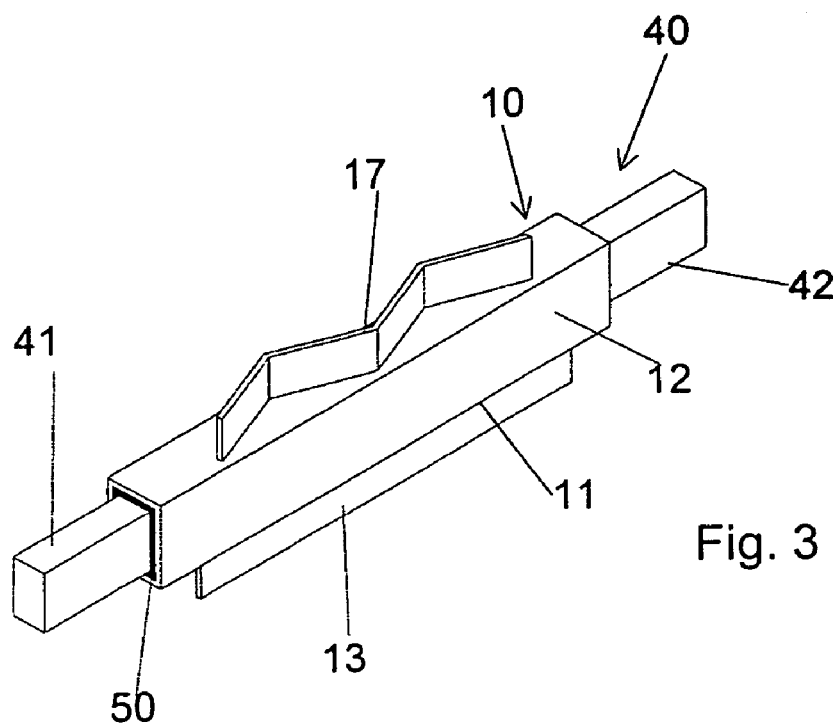
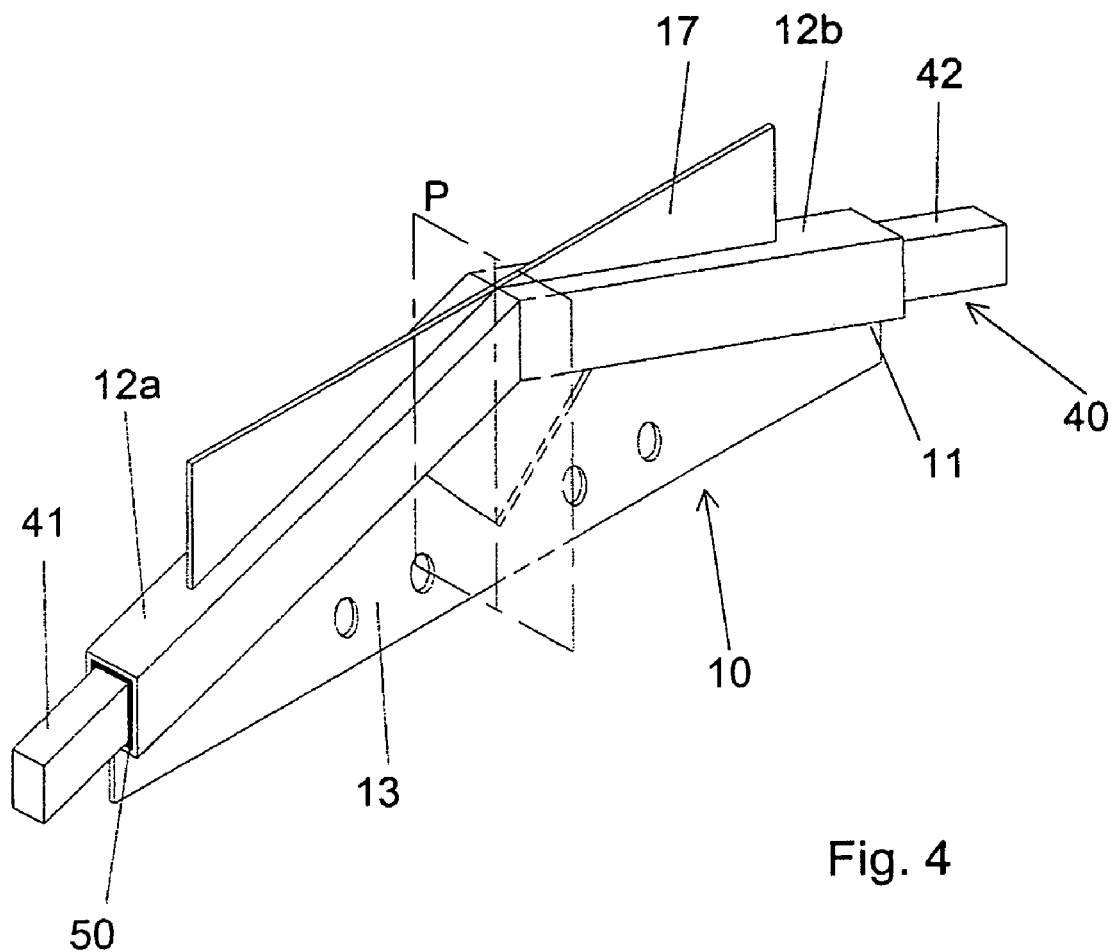

REINFORCING DEVICE FOR BUSHING USED TO PRODUCE FILAMENTS, SUCH AS GLASS-BASED FILAMENTS

This application is a 371 of PCT/FR04/00255 filed on 4 Feb. 2004.

BACKGROUND OF THE INVENTION

I. Field of the Invention

The invention relates to a fiberizing installation delivering fibers, especially glass fibers, and more particularly to the mechanical reinforcement of one of the components of the fiberizing installation.

II. Description of Related Art

Conventionally, a fiberizing installation comprises a glass flow block, which receives molten glass coming from a feeder connected to the furnace in which the glass is melted, a bushing block and a bushing. The bushing is provided at the bottom with a plate provided with a multitude of holes from which the molten glass flows, to be drawn into a multiplicity of filaments.

These filaments, the diameter of which may vary from 5 to 33 μm, are collected into at least one sheet that converges on an assembling device in order to form at least one strand and, for example, to be wound up. Depending on its use, the strand may also be chopped (to form chopped strands) or thrown onto a belt (to form continuous strand mats).

The products obtained are used mainly in various reinforcing applications.

The bushing is manufactured from an alloy of platinum and rhodium, which materials are electrically conducting and resistant over time to very high temperatures. This bushing is heated by the Joule effect (resistance heating) so as to maintain, at a certain temperature, around 1100 to 1400° C., the glass that it contains so that it remains in the molten state so as to be drawn from the holes in the bottom of the bushing. The bushing is heated using an electrical transformer by the connection of two terminals, each located on each of the opposed ends of the bushing, to electrical connection components external to the bushing.

The terminals of the bushing are attached by welding them to the side walls of the bushing. They project so as to be connected to the external connection components.

Placed inside the bushing, in a plane substantially parallel to the bottom of the bushing and on the bushing block side, is a screen intended to thermally condition the glass and to absorb some of the hydrostatic pressure exerted by the molten glass.

The molten glass exerts high stresses, of around 6000 Pa, on the sides, the screen and the bottom of the bushing. Over the course of time, these stresses, combined with the heat, tend to distort the bottom, the screen and the sides of the bushing. Furthermore, the external electrical connection components connected to the terminals of the bushing are suspended therefrom, exerting an additional mechanical tensile force on the bushing, which also causes the bushing to deform over time.

Over the course of time, the hot creep of the constituent materials of the bushing, combined with the hydrostatic pressure of the molten glass, tends to deform the bottom, the screen and the sides, consequently causing strand quality and titer uniformity problems and yield problems.

The tensile forces (weight) of the suspended components and the linear expansion of the walls of the bushing also induce high mechanical stresses.

So as partly to prevent deformation of the bushing, it is known to add, in the upper part of the bottom of the bushing and between its sides, a plurality of mutually parallel reinforcement components lying in planes transverse to the plane of the bottom of the bushing and transversely to the longest sides of the bushing. In the rest of the description, the terms upper and lower are defined relative to the flow direction of the glass through the bushing, the glass being drawn from the upper part toward the lower part.

U.S. Pat. No. 3,920,430 discloses such a reinforcement component or device which helps to improve its resistance to bending, while not increasing the weight of platinum or platinum alloy needed for its construction, by additionally providing a ceramic rod placed inside the reinforcement component.

In that document, the reinforcement component consisting of a longitudinal bar is hollow and houses a ceramic rod that extends beyond each of the ends of the reinforcement bar and is anchored into the concrete for packing the bushing. That document insists on the fact that the rod is placed in the upper part of the reinforcement bar, bearing on the upper internal wall of the bar and leaving an empty space in the lower part of the bar.

However, this reinforcement bar, owing in particular to the internal empty space in the lower part, is not sufficiently resistant to bending. Furthermore, owing to the platinum creep temperature, the bar deforms, its lower part slumps and the thrust forces exerted by the glass on the bottom of the bushing end up by deforming it.

BRIEF SUMMARY OF THE INVENTION

It is therefore the object of the invention to provide a reinforcement device making it possible to improve the resistance to the bending resulting from the alloy creeping and to stabilize its thermal level over the time it is in operation.

The reinforcement device, especially for the bottom of a bushing having a multitude of holes from which filaments, especially glass filaments are drawn, comprising a reinforcement piece that comprises a hollow first part defining at least one receiving housing and a second part that extends at least partly over the length of the hollow part, and also at least one stiffener inserted into the receiving housing of the hollow part, is characterized in that the cross section of the stiffener is substantially identical to the internal cross section of the hollow part.

According to one feature, the device includes a refractory additional material placed in the receiving housing of the hollow part between the stiffener and the internal walls of the hollow part so as to fill the remaining spaces in the manner of a seal. This refractory additional material is preferably a refractory plastic insulator.

Advantageously, the stiffener is made of at least one material whose hot creep resistance is greater than the hot creep resistance of the material of which the hollow part is made. This material may be of the ceramic type, such as alumina with a purety of at least 99.5% and preferably 99.7 to 99.8%. This material may also be an iron-based or nickel-based or titanium-based ODS alloy.

According to another feature of the device, the hollow part has an oblong shape that extends along a single direction, or else it may rather have a shape in the manner of an upside down V, comprising two portions extending along two different directions and coming into abutment in a joint plane. In the latter variant, the two portions of the hollow element constitute two respective receiving housings into each of which at least one stiffener is inserted.

According to another feature, the hollow part is made of a single piece, or else in the variant of the two portions of the hollow part, it may be made of two pieces fastened together.

According to yet another feature, the hollow part has a cross section of square, rectangular, round, oval, triangular or trapezoidal shape.

Preferably, the reinforcement piece is made of a platinum alloy.

Finally, the body of the reinforcement piece preferably has a third part on the opposite side from the second part and extending at least partly over the length of the hollow part.

According to the invention, at least one reinforcement device may advantageously be used in a bushing, the reinforcement device or devices extending in a plane transverse to the longest sides of the bushing, and the ends of the stiffener or stiffeners extending from the hollow part and being fastened into the concrete for packing the bushing, the whole assembly thus forming an undeformable block.

According to one feature, the device is attached to the bottom by attaching the longitudinal free end of the second part of the reinforcement piece and the lateral free ends of the hollow part of the reinforcement piece.

According to another feature, the bushing includes a screen placed on top of the reinforcement device or devices, the third part of the reinforcement piece being fastened to the screen.

Other advantages and features of the invention will now be described in greater detail with regard to the appended drawings in which:

BRIEF DESCRIPTION OF THE DRAWINGS

FIGS. 3 and 4 are variants of FIG. 2; and

DETAILED DESCRIPTION OF THE INVENTION

Figure 1:
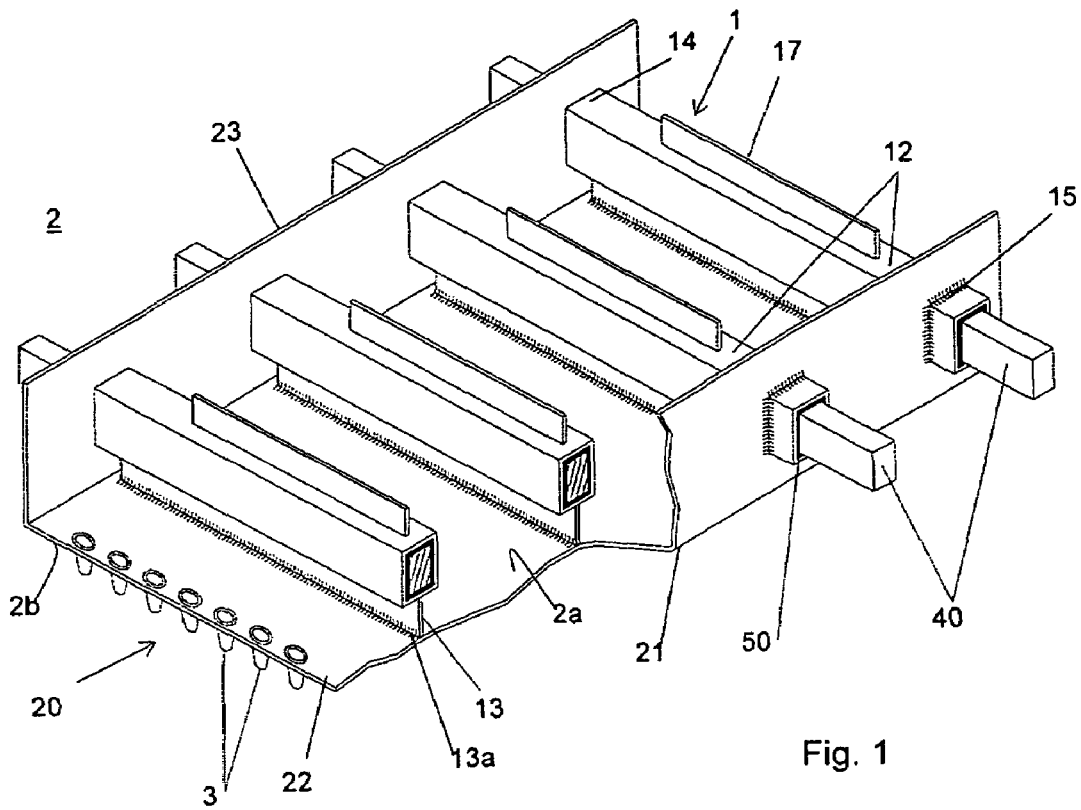
FIG. 1 illustrates a partial view of the bottom of a bushing to which a plurality of reinforcement devices of the invention are added.

FIG. 1 illustrates several reinforcement devices 1 of the invention that are added to a plate 20 of the bottom 2 of a bushing (not shown in detail) and intended to form part of a fiberizing installation capable of delivering, for example from molten glass, glass filaments.

The bottom 2 comprises a rectangular plate 20 having opposed sides 21 that will be called the long sides, and shorter sides 22 perpendicular to these long sides that will be called the short sides. The long sides 21 are provided with perpendicular flanges 23 extending from the upper face 2a of the plate 20.

Arranged on the lower face 2b of the plate 20 are nipples 3 that are drilled with holes from which the glass is drawn into filaments.

The devices 1 are placed so as to be inserted between the rows of nipples so as not to disturb the flow of glass through the latter, for example between two double rows.

Figure 2:
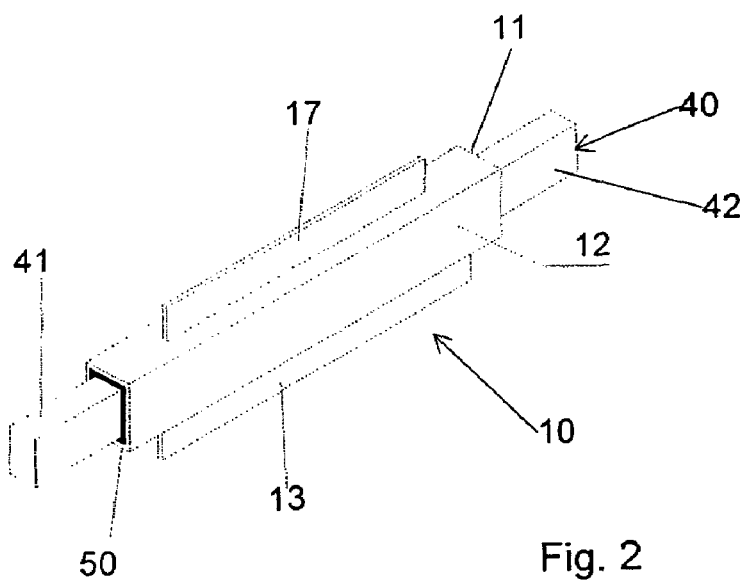
FIG. 2 shows a side view of a reinforcement device of the invention.

Each reinforcement device 1 as illustrated in detail in FIGS. 2 to 4 comprises a reinforcement piece 10 and at least one stiffener 40.

The reinforcement piece 10 comprises a longitudinal body 11 that has a central hollow first part 12 and a lower second part 13 which will be called the skirt and which extends over part or the entire length of the hollow part 12.

The device is joined to the bottom 2 in such a way that the body 11 extends in a direction transverse to the long sides 21, the opposed lateral free ends 14 and 15 of the hollow part being fastened to the flanges 23 and projecting from these flanges, and the longitudinal end 13a of the skirt 13 of the body being fastened to the upper face 2a of the plate 20.

To limit the weight of the reinforcement piece, the skirt 13 may advantageously be drilled with holes (FIG. 4) or else consist of several parts spaced apart along the length of the hollow part 12 (not illustrated).

The central hollow part 12 of the reinforcement piece defines at least one receiving housing for at least one stiffener 40, the ends 41, 42 of said stiffener, after it has been inserted, projecting from the respective lateral ends 14 and 15 of the hollow part.

The ends 41, 42 of the stiffener are anchored in the concrete (not illustrated) for packing the bushing. This results in complete consolidation of the assembly formed by the bushing and by the packing concrete, which too is nondeformable.

Figure 5:
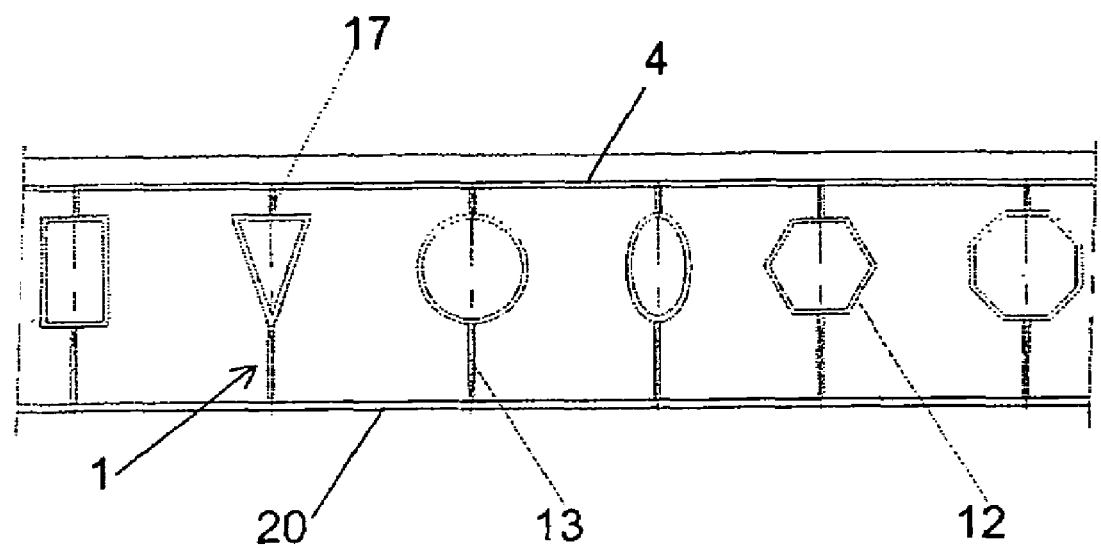
FIG. 5 is a cross-sectional view of various shapes of the reinforcement device added to the bottom of the bushing and to the screen of the bushing.

The hollow part 12 may have cross sections of various shapes (FIG. 5), for example square, rectangular, round, oval, triangular or trapezoidal shapes, the stiffener 40 preferably having a cross section substantially identical to the internal cross section of the hollow part in order for it to be tightly inserted into the housing.

The hollow part 12 may extend along a single direction, as shown in FIGS. 2 and 3. A single stiffener 40, which is in the form of a rod of approximately identical cross section, section, is then placed in the receiving housing.

As a variant, (FIG. 4), the hollow part 12 may extend along two directions that intersect in the upper part of the body, on the opposite side from the skirt 13, and in a joint plane P, to form two portions 12a and 12b, the whole assembly thus having a cross section in the form of an upside down V in the manner of a roof truss, which, as is well known, exhibits better resistance to bending.

This configuration is produced as a single piece or else as at least two pieces welded along the joint plane P. In this variant, the portions 12a and 12b provide at least two receiving housings for two respective stiffeners 40, the ends of the stiffeners 40 in the plane P having to be contiguous over their entire surface.

The body 11 of the reinforcement piece 10 is made of platinum alloy material, which may or may not be similar to the bottom of the bushing, whereas the stiffener 40 is made of a material other than platinum and whose hot creep strength is greater than the hot creep strength of the material of which the reinforcement piece is made. The reinforcement device is thus lighter than if the central part 12 were to be solid and made of platinum.

The material of the stiffener 40 may be a material of the ceramic type, such as alumina, silicon nitride or zirconia, or else of the nickel-based or iron-based or titanium-based (ODS Oxide-Dispersion-Strengthened) alloy type, or else of the refractory alloy type, especially one based on tungsten or molybdenum or niobium, although this type of alloy is expensive.

The ceramic-type material has the advantage of not forming a eutectic with platinum.

The ODS alloy type material has the advantage of being able to be used at very high temperatures, of around 1500 to close to 1700° C.

Advantageously, a refractory additional material 50 is provided, this being introduced into the spaces remaining between the internal walls of the part 12 and the stiffener 40 after it has been housed, in the manner of a seal so as to immobilize the stiffener 40 in its housing and to prevent any deformation of the hollow part 12. This material 50 is, for example, a refractory plastic insulator, such as the material REFRACTOL® from the company Réfractol.

There is therefore complete rigidity of the entire reinforcement piece, without any risk, as in the prior art, of deformation of the hollow reinforcement piece around the inner rod causing the skirt to slump and the bottom to deform. Furthermore, there is no space inside the hollow part 12, thereby preventing, unlike the prior art, platinum being sublimed on the stiffener. Thus, platinum losses are minimized, resulting in cost savings when recycling the platinum after the end of operation of the bushing.

The body 11 is attached to the bottom 2 of the bushing by welding, firstly by fastening the longitudinal end 13a of the lower part against the upper face 2a of the bottom and, secondly, fastening the opposed lateral free ends 14 and 15 of the hollow part, coming through the flanges 23.

Optionally and preferably, the body 11 includes an upper, third part 17 placed on the opposite side from the lower part 12 and extending over part or the entire length of the hollow part 12. This upper part 17 is used to support the screen 4 of the bushing and prevents it from deforming. This upper part 17 is attached to the screen spontaneously by metal diffusion during the operation of the bushing (once it has been heated up and during the first few days of operation).

This additional attachment in the upper part thus ensures that all the elements of the bushing are completely consolidated.

The bushing thus constitutes a nondeformable rigid block. The thermal image and the head loss are retained. The operation of the bushing is thereby facilitated, in particular avoiding interruptions to the fiberizing process for adjustment. The quality of the product obtained is constant over time and the manufacturing yield is higher.

The invention claimed is:

1. A reinforcement device, for a bottom of a bushing having a multitude of holes from which filaments are drawn, comprising:
    a reinforcement piece that comprises a hollow first part defining at least one receiving housing;
    a second part that extends at least partly over a length of the hollow first part;
    at least one stiffener in the receiving housing of the hollow first part having a cross section substantially identical to an internal cross section of the hollow first part; and
    a refractory additional material placed in the receiving housing of the hollow first part between the stiffener and internal walls of the hollow first part thereby sealing remaining spaces between the internal walls and the stiffener.

2. The device as claimed in claim 1, wherein the refractory additional material further comprises:
    a refractory plastic insulator.

3. The device as claimed in claim 1, wherein the stiffener is made of at least one material having a hot creep resistance greater than a hot creep resistance of a material of the hollow part.

4. The device as claimed in claim 3, wherein the material of the stiffener comprises ceramic.

5. The device as claimed in claim 4, wherein the material of the stiffener comprises alumina with a purity of at least 99.5% and preferably 99.7 to 99.8%.

6. The device as claimed in claim 4, wherein the material of the stiffener comprises an iron-based or nickel-based or titanium-based ODS alloy.

7. The device as claimed in claim 1, wherein the hollow first part is of oblong shape, extending along a single direction.

8. The device as claimed in claim 1, wherein the hollow first part is of a unitary construction.

9. The device as claimed in claim 1, wherein the hollow first part has a cross section of square, rectangular, round, oval, triangular, or trapezoidal shape.

10. The device as claimed in claim 1, wherein the reinforcement piece is formed of a platinum alloy.

11. A reinforcement device, for a bottom of a bushing having a multitude of holes from which filaments are drawn, comprising:
    a reinforcement piece that comprises a hollow first part defining at least one receiving housing, wherein the hollow first part has a shape in a manner of an upside down V comprising two portions extending along two different directions and coming into abutment in a joint plane;
    a second part that extends at least partly over a length of the hollow first part; and
    at least one stiffener in the receiving housing of the hollow first part.

12. The device as claimed in claim 11, wherein the two portions of the hollow first part constitute two respective receiving housings, each including at least one stiffener therein.

13. The device as claimed in claim 11, wherein the two portions of the hollow first part are two respective pieces fastened together.

14. A reinforcement device, for a bottom of a bushing having a multitude of holes from which filaments are drawn, comprising:
    a reinforcement piece that comprises a hollow first part defining at least one receiving housing;
    a second part that extends at least partly over a length of the hollow first part;
    a third part on an opposite side from the second part and extending at least partly over the length of the hollow first part; and
    at least one stiffener in the receiving housing of the hollow first part.

15. The device as claimed in claim 14, further comprising:
    a screen placed on top of the at least one reinforcement device, wherein the third part of the reinforcement piece is fastened to the screen.

16. A bushing configured to deliver filaments, comprising:
    a bottom provided with a multitude of holes from which the filaments flow and including at least one reinforcement device, wherein the at least one reinforcement device extends in a plane transverse to longest sides of the bushing and further comprises:
        a reinforcement piece that comprises a hollow first part defining at least one receiving housing;
        a second part that extends at least partly over a length of the hollow first part;
        at least one stiffener in the receiving housing of the hollow first part having a cross section substantially identical to an internal cross section of the hollow first part;
        a refractory additional material placed in the receiving housing of the hollow first part between the stiffener and internal walls of the hollow first part thereby sealing remaining spaces between the internal walls and the stiffener; and
        ends of the at least one stiffener extending from the hollow first part and being fastened into concrete for packing the bushing.

17. The bushing as claimed in claim 16, wherein the at least one reinforcement device is attached to the bottom by attaching a longitudinal free end of the second part of the reinforcement piece and lateral free ends of the hollow first part of the reinforcement piece.

18. The bushing as claimed in claim 16, wherein the refractory additional material further comprises:

a refractory plastic insulator.

19. The bushing as claimed in claim 16, wherein the stiffener is made of at least one material having a hot creep resistance greater than a hot creep resistance of a material of the hollow part.

20. The bushing as claimed in claim 19, wherein the material of the stiffener comprises ceramic.

* * * * *